Aug. 8, 1961 K. S. TYLER 2,995,062
ANIMATION EFFECTS DEVICE
Filed Aug. 12, 1959 2 Sheets-Sheet 1

INVENTOR
KINGDON S. TYLER
BY
HIS ATTORNEYS

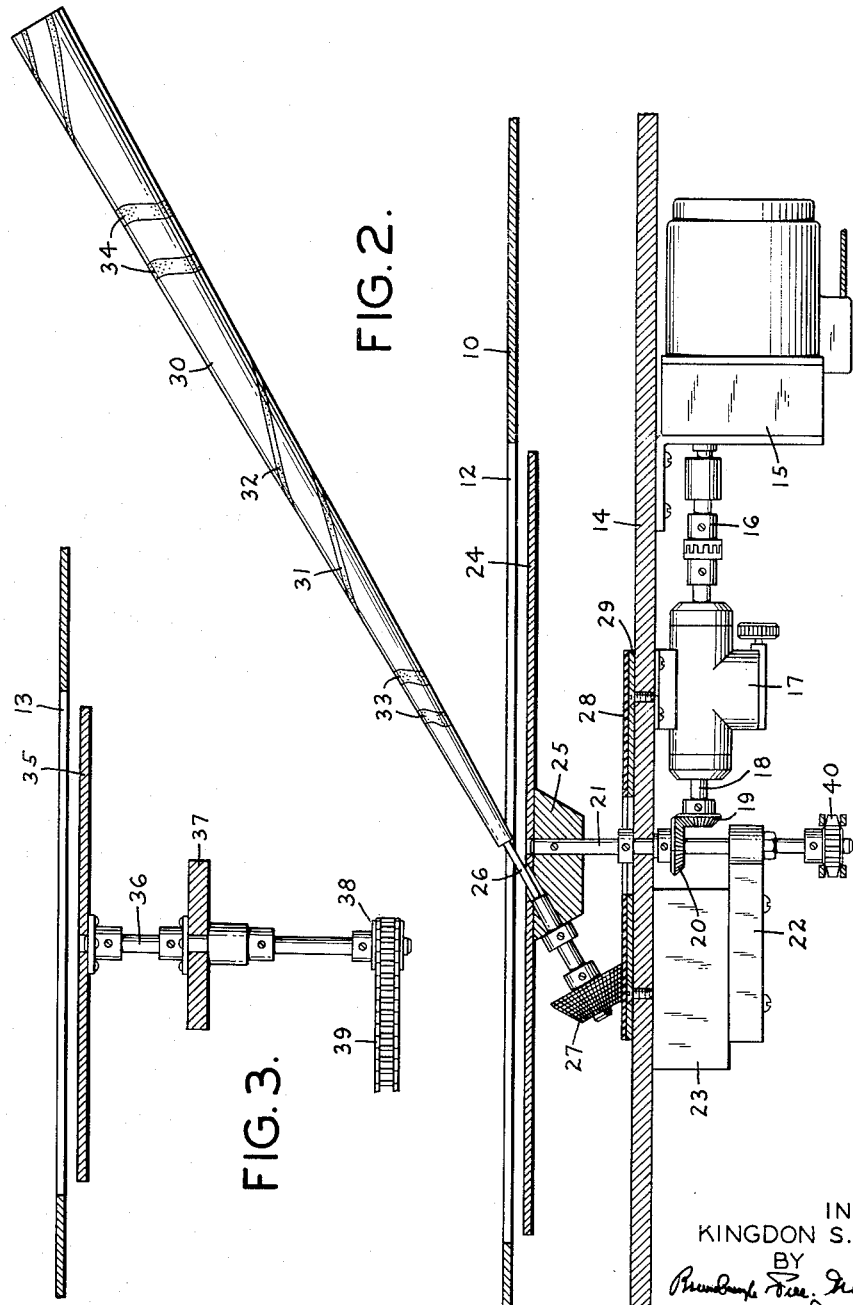

United States Patent Office 2,995,062
Patented Aug. 8, 1961

2,995,062
ANIMATION EFFECTS DEVICE
Kingdon S. Tyler, Silver Spring, Md., assignor to Vitro Corporation of America, New York, N.Y.
Filed Aug. 12, 1959, Ser. No. 833,284
6 Claims. (Cl. 88—16)

This invention relates to devices by means of which the preparation of animated films and the like is facilitated, and it relates particularly to devices by means of which a plurality of elements may be moved through selected paths.

Heretofore, in the preparation of animated films, it has been necessary to produce a great many drawings showing various stages of an action. In addition, transparent overlays and the like are required for backgrounds or disclosing associated action in the animation. The various drawings and overlays, alone or in combination, are photographed by means of a sequence camera to produce a film which shows the desired action.

The preparation of such drawings and overlays is, of course, expensive and time consuming and great skill is required in making them. In many animations fewer drawings and overlays would be required if an apparatus could be provided for producing an action which can be photographed directly and without the need for sequence photography.

In accordance with the present invention, a device is provided for producing action effects including a plurality of motions which can represent radar signaling and detection, wave motion, and the like, thereby doing away with the need of the overlays and drawings usually required to represent such actions.

More particularly, in accordance with the present invention, a display and animation device is provided whereby a plurality of motions are produced in different relations in order to give desired effects. Thus, in accordance with the present invention, a typical diplay device may include a transparent rod which is provided with a trace or marking thereon which gives the effect of an outgoing or incoming wave or signal as the rod is rotated. The rod is mounted so that it can be turned bodily in front of a support or platform and simultaneously rotated about its axis to thereby give the effect of a radar scanning beam, a lighthouse beacon, or many other effects. Moreover, the device may have other rotary members associated with the beam which may be appropriately designed or decorated to give effects such as the wake of a ship, wave motions, or the like.

In this way, by setting up models of ships, aircraft, or the like, on the supporting platform, it is possible to produce an animation or action without overlays or drawings.

For a better understanding of the present invention reference may be had to the accompanying drawings, in which:

FIGURE 2 is a view in section on line 2—2 of FIGURE 1; and

FIGURE 3 is a view in section on line 3—3 of FIGURE 1.

Figure 1:
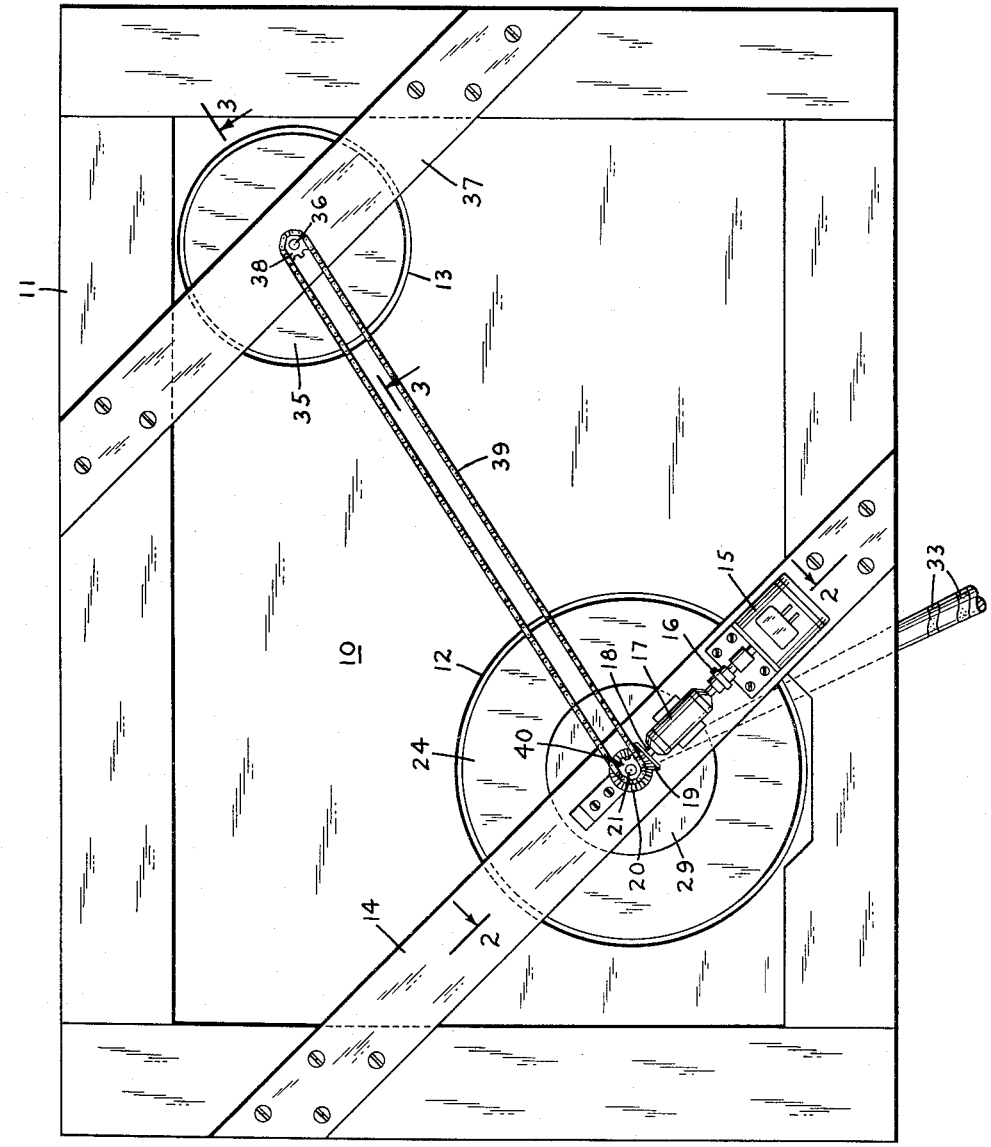
FIGURE 1 is a rear plan view of a typical animation apparatus of the type embodying the present invention.

In the illustrative form of the device disclosed herein, a support or platform 10 is provided which may be suitably reinforced around its edges by means of a frame 11 to make rigid and strengthen it. The platform 10 may be disposed horizontally as indicated in FIGURE 2 and may have its front surface appropriately painted or decorated to give a desired effect. Also, the platform may be used to support models, for example, models of ships, aircraft, vehicles and the like. Suitable openings 12 and 13 are provided in the platform and one or both of these openings may, if desired, be provided with a transparent window formed of glass or transparent plastic. However, for most purposes, the windows may be omitted.

Extending across the back of the platform and secured to the frame 11 is a diagonally arranged cross member 14 on which the drive mechanism for the apparatus is provided. As shown in FIGURES 1 and 2, the drive mechanism includes an electric motor 15 which is connected by means of a detachable coupling 16 to a variable speed gearing 17. The output shaft 18 of the gearing 17 is provided with a bevel gear 19 which meshes with a bevel gear 20 fixed to a vertical shaft 21 which is rotatably mounted in the cross member 14 and also in a bearing supporting arm 22 carried by a spacer block 23 fixed to the underside of the cross member 14. Upon operation of the motor 15, the shaft is rotated about an axis substantially perpendicular to the platform 10. Affixed to the upper end of the shaft beneath and visible through the opening 12 in the platform is a rotary member 24 which may be disc-like or non-circular, as desired. A bearing block 25 is also secured to the upper end of the shaft 21 and to the member 24 and carries rotatably therein a shaft 26 which has its axis inclined at an acute angle to the shaft 21. As illustrated, the axes of the shafts 21 and 26 may intersect. A knurled friction wheel 27 mounted on the lower end of the shaft 26 engages a rubber facing 28 on a fixed support 29 secured to the upper surface of the cross member 14. When the shaft 21 is rotated, the knurled friction wheel 27 rolls on the rubber facing 28 and causes the shaft 26 to revolve about the shaft 21 and to rotate about its own axis.

The combined rotations of the disc member 24 and the shaft 26 can be used to simulate any of a number of desired actions. Thus, as shown in FIGURE 2, an elongated tapered rod 30 formed of transparent plastic or the like is secured to the upper end of the shaft 26 in a position overlying the platform 10. Painted on or secured to the rod are generally helical traces or bands 31 and 32, which upon the rotation of the rod 30 give the effect of a wave signal traveling lengthwise of the rod. The traces when viewed through the rod 30 produce a pattern like the bands 33 and 34 which also simulate very closely a wave traveling along the rod 30. By appropriately inclining the traces 31 and 32 with respect to the axis of the shaft, the signals 33 and 34 can be made to travel outwardly or inwardly as desired. In this way, the traces can be made to represent a radar, sonar or echo sounding beam, the light of a lighthouse, or the like. As a further basis for animation effects, the member 24 may be provided with a pattern to simulate the wake of a ship, wave motion, or the like, as the member rotates, or portions of a terrain.

Additional effects can be achieved by means of a rotary disc or member 35 positioned behind the opening 13. This member may be supported on a shaft 36 rotatably mounted in the cross member 37 on the back of the frame and driven by means of a sprocket 38 therein, a chain 39 and a sprocket 40 on the lower end of the shaft 21.

It will be understood that additional motions can be achieved by mounting more than one rod 30 on the bearing block 25 in angular relation to each other, and a plurality of discs 35, for example, may be provided throughout the extent of platform to give various visual effects.

Moreover, while the means for rotating the rod 30 is illustrated as a knurled friction wheel 27, it will be understood that the friction wheel and the friction member 28 may be replaced by appropriate gearing and the like, if a positive drive is desired.

Accordingly, the form of the invention described herein should be considered as illustrative.

I claim:
1. An animation effects device comprising a first ro- tatable member, means for rotating said member about a fixed axis, a supporting member carried by and rotatable with the first rotatable member, a second member mounted in said supporting member for rotation about an axis inclined to the axis of rotation of said first member, and means responsive to rotation of said first member about its axis for rotating said second member about its axis.

2. The device set forth in claim 1 in which said second member is a tapered transparent rod.

3. The device set forth in claim 1 in which said means for rotating said second member about its axis comprises a fixed friction member adjacent to said first member, and a wheel connected to said second member and engaging said friction member.

4. The device set forth in claim 3 in which said second member is a tapered transparent rod having a substantially helical trace thereon.

5. An animation effects device comprising a supporting platform having an opening therein, a shaft aligned with said opening and substantially perpendicular to said platform, means for rotating said shaft around its axis, a supporting member mounted on said shaft behind said platform and opposite to said opening, an elongated member mounted in said supporting member for rotation about an axis inclined to the axis of said shaft, said elongated member extending through said opening and having a portion thereof disposed in front of said platform, and means behind said platform for rotating said elongated member around its axis in response to rotation of said shaft.

6. The device set forth in claim 5 in which the means for rotating said elongated member around its axis comprises a friction wheel on said elongated member and a fixed friction surface behind said platform engaging said wheel.

References Cited in the file of this patent
FOREIGN PATENTS 372,911     Germany _____ Apr. 5, 1923